(12) United States Patent
Iwasaki et al.

(10) Patent No.: US 11,981,291 B2
(45) Date of Patent: May 14, 2024

(54) LUGGAGE ROOM BOARD

(71) Applicant: KYORAKU CO., LTD., Kyoto (JP)

(72) Inventors: Kenji Iwasaki, Nagoya (JP); Sho Nakajima, Yamato (JP); Yoshitaka Matsubara, Chuo-ku (JP); Yuki Harasawa, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 341 days.

(21) Appl. No.: 17/605,366

(22) PCT Filed: Apr. 23, 2020

(86) PCT No.: PCT/JP2020/017427
§ 371 (c)(1),
(2) Date: Oct. 21, 2021

(87) PCT Pub. No.: WO2020/218394
PCT Pub. Date: Oct. 29, 2020

(65) Prior Publication Data
US 2022/0212604 A1    Jul. 7, 2022

(30) Foreign Application Priority Data

Apr. 26, 2019 (JP) .................................. 2019-086321
Jun. 28, 2019 (JP) .................................. 2019-122242

(51) Int. Cl.
*B60R 5/04* (2006.01)
*B29C 51/10* (2006.01)
(Continued)

(52) U.S. Cl.
CPC ............ *B60R 5/044* (2013.01); *B29C 51/105* (2013.01); *B29C 51/12* (2013.01); *B29L 2031/3005* (2013.01)

(58) Field of Classification Search
CPC .......... B60R 5/044; B60R 5/045; B60R 5/048
See application file for complete search history.

(56) References Cited

U.S. PATENT DOCUMENTS

| 2016/0200372 A1 | 7/2016 | Ishii et al. |
| 2018/0229642 A1 | 8/2018 | Kaatz |
| 2020/0290526 A1* | 9/2020 | Blom ...................... B60R 5/048 |

FOREIGN PATENT DOCUMENTS

| JP | H11-20850 A | 1/1999 |
| JP | 2000-177492 A | 6/2000 |

(Continued)

OTHER PUBLICATIONS

Office Action issued on Oct. 31, 2022 in corresponding Korean Patent Application No. 10-2021-7035018; 10 pages.

(Continued)

*Primary Examiner* — Zachary M Davis
(74) *Attorney, Agent, or Firm* — Maier & Maier, PLLC

(57) ABSTRACT

The present invention aims to provide a luggage room board that reliably produces a cushioning effect during opening and closing operations, whereby the impact is not applied during the opening and closing operations. The luggage room board 1 includes the luggage room board main body 2 made of resin and is configured to be opened and closed. For example, a tape-shaped cushioning material (non-woven fabric) is attached to the luggage room board main body 2 along two sides orthogonal to a rotation center line serving as the rotation center of the opening and closing operations. At one of ends 20a of a non-woven fabric 20, a concave portion 30 is provided on a surface of the luggage room board main body 2 to which the non-woven fabric is attached, and the end 20a of the non-woven fabric 20 is attached so as to enter the concave portion 30. The concave portion 30 is formed such that a depth gradually increases toward the end 20a of the non-woven fabric 20. The depth of the concave portion 30 at the end 20a of the non-woven fabric 20 is approximately same as the thickness of the non-woven fabric 20 or larger than the thickness of the (Continued)

non-woven fabric. The concave portion 30 is provided at the end of the non-woven fabric 20 on a side of the rotation center line.

3 Claims, 19 Drawing Sheets

(51) Int. Cl.
    *B29C 51/12*      (2006.01)
    *B29L 31/30*      (2006.01)

(56) References Cited

FOREIGN PATENT DOCUMENTS

| | | |
|---|---|---|
| JP | 2002-187485 A | 7/2002 |
| JP | 2005-103966 A | 4/2005 |
| JP | 2009-039967 A | 2/2009 |
| JP | 2009184222 A | 8/2009 |
| JP | 2016-068345 A | 5/2016 |
| JP | 2018-103903 A | 7/2018 |
| WO | 2014/102867 A1 | 7/2014 |
| WO | 2016/125646 A1 | 8/2016 |

OTHER PUBLICATIONS

International Search Report issued on Aug. 4, 2020 in corresponding International Application No. PCT/JP2020/017427; 4 pages.
Office Action issued on Feb. 27, 2023 in corresponding Chinese Application No. 2020800300584, 12 pages.
Office Action issued on Mar. 14, 2023 in corresponding Japanese Application No. 2019086321, 10 pages.

\* cited by examiner (A)

(B)

LUGGAGE ROOM BOARD

TECHNICAL FIELD

The present invention relates to a luggage room board to which a cushioning material is attached and, in particular, to a technique for preventing the cushioning material from peeling off.

BACKGROUND ART

For example, resin luggage room boards are known for automobile interior components, such as cargo floor panels (cover panels or luggage boards of automobile luggage rooms) and rear parcel shelves. Among them, a hollow molded body with a skin in which a fiber sheet is attached to a surface of the hollow molded body manufactured by blow molding a thermoplastic resin is widely used as this kind of luggage room board because it is not only lightweight and strong but also has excellent appearance and texture.

For example, Patent Literature 1 discloses a luggage room board manufactured by attaching a strap to a luggage room board main body, and the luggage room board can be opened and closed using the strap. Further, the luggage room board main body disclosed in Patent Literature 1 consists mainly of a hollow molded body made of resin, and a skin material, such as a carpet, is attached to its surface.

CITATION LIST

Patent Literature

Patent Literature 1: JP-A-2018-103903

SUMMARY OF INVENTION

Technical Problem

While a skin material is attached to a front surface (upper surface) of the luggage room board facing a user, no skin material is attached to the opposite surface (back surface). Therefore, when the luggage room board is opened and closed, a side of the luggage room board main body made of resin to which the skin material is not attached comes into direct contact with a portion around an opening provided in a luggage room of a vehicle. This causes problems, such as damage to the luggage room board main body made of resin and the portion around the opening of the vehicle due to the impact and the generation of impact noise.

The present invention has been proposed in view of such circumstances and aims to provide a luggage room board that reliably produces a cushioning effect during opening and closing operations, whereby the impact is not applied during the opening and closing operations.

Solution to Problem

In order to achieve the above object, the luggage room board of the first invention of the application is a luggage room board configured to be opened and closed, comprising: a luggage room board main body made of resin, wherein a tape-shaped cushioning material is attached to the luggage room board main body, at least at one end of the cushioning material, a concave portion is provided on a surface of the luggage room board main body, the cushioning material being attached to the surface, and the end of the cushioning material is attached so as to enter the concave portion.

If the luggage room board main body made of resin comes into direct contact with the portion around the opening of the vehicle, it will be subjected to impact during opening and closing operations. In the luggage room board of the present invention, a tape-shaped cushioning material (for example, non-woven fabric) is attached to a back surface of the luggage room board main body, and the non-woven fabric serves as a cushioning material to reduce the impact when the luggage room board is opened and closed.

Further, in the luggage room board to which the tape-shaped non-woven fabric is attached, if some force is unintentionally applied to an end of the cushioning material, there is a possibility that it will be rolled up and peeled off from the end. In the luggage room board of the present invention, at the end of the cushioning material, a concave portion is provided on a surface of the luggage room board main body to which the cushioning material is attached, and the end of the cushioning material is attached so as to enter the concave portion. Consequently, the end surface of the tape-shaped cushioning member is not exposed, and the unintentional peeling of the cushioning material is reliably prevented.

A second invention of the present application relates to a resin panel and a manufacturing method thereof.

Conventionally, a resin panel with a certain strength accommodating a core material made of foamed resin inside an outer skin material made of resin have been known. For example, JP-A-2005-297220 discloses a resin panel in which a core material made of phenolic resin foam is included inside an outer skin material of the form of a fiber-reinforced phenolic panel.

The conventional resin panel has a structure in which the core material is uniformly arranged. In view of the above techniques, the present disclosure provides a resin panel having various structures and a manufacturing method thereof according to various embodiments.

According to an aspect of the second invention of the present application, provided is a resin panel comprising: a first region comprising a core material, a first front side layer, and a first back side layer, the first front side layer and the first back side layer forming a hollow portion accommodating the core material inside; a second region comprising a second front side layer and a second back side layer and having a predetermined rigidity without accommodating the core material; and a third region comprising a third front side layer and a third back side layer and connecting the first region and the second region, wherein the first region, the second region, and the third region are integrally molded with resin.

According to an aspect of the second invention of the present application, provided is a manufacturing method of a resin panel including a first region with a hollow portion accommodating a core material and a second region having a predetermined rigidity without accommodating the core material, comprising: an arrangement step of arranging two resin sheets in a molten state between a pair of split molds, the pair of split molds being arranged to face each other and movable between a mold clamping position and an open position, at least one of the split molds including a first cavity corresponding to the first region and a second cavity corresponding to the second region; a shaping step of shaping at least one of the resin sheets in the molten state along at least one of the split molds provided with the first cavity and the second cavity; and an integration step of integrating a peripheral edge of the at least one of the resin sheets after shaping and a peripheral edge of the other resin sheet with each other by moving the pair of split molds from the open position to the mold clamping position Advantageous Effects of Invention According to the first invention of the present application, it is possible to provide a luggage room board that reliably produces a cushioning effect during opening and closing operations, whereby the impact is not applied during the opening and closing operations.

According to the second invention of the present application, it is possible to provide a resin panel having various structures and a manufacturing method thereof.

The above effects are merely exemplary for convenience of explanation and are not limiting. In addition to or in place of the above effects, it is also possible to achieve any effects described in the present disclosure or effects that are obvious to those skilled in the art.

BRIEF DESCRIPTION OF DRAWINGS

FIG. 8A shows a state before compression, and FIG. 8B shows a state after compression.

DESCRIPTION OF EMBODIMENTS

Hereinafter, embodiments in which the present invention is applied to a luggage room board for a vehicle will be described in detail with reference to the drawings.
(Embodiment of First Invention)

Figure 1:
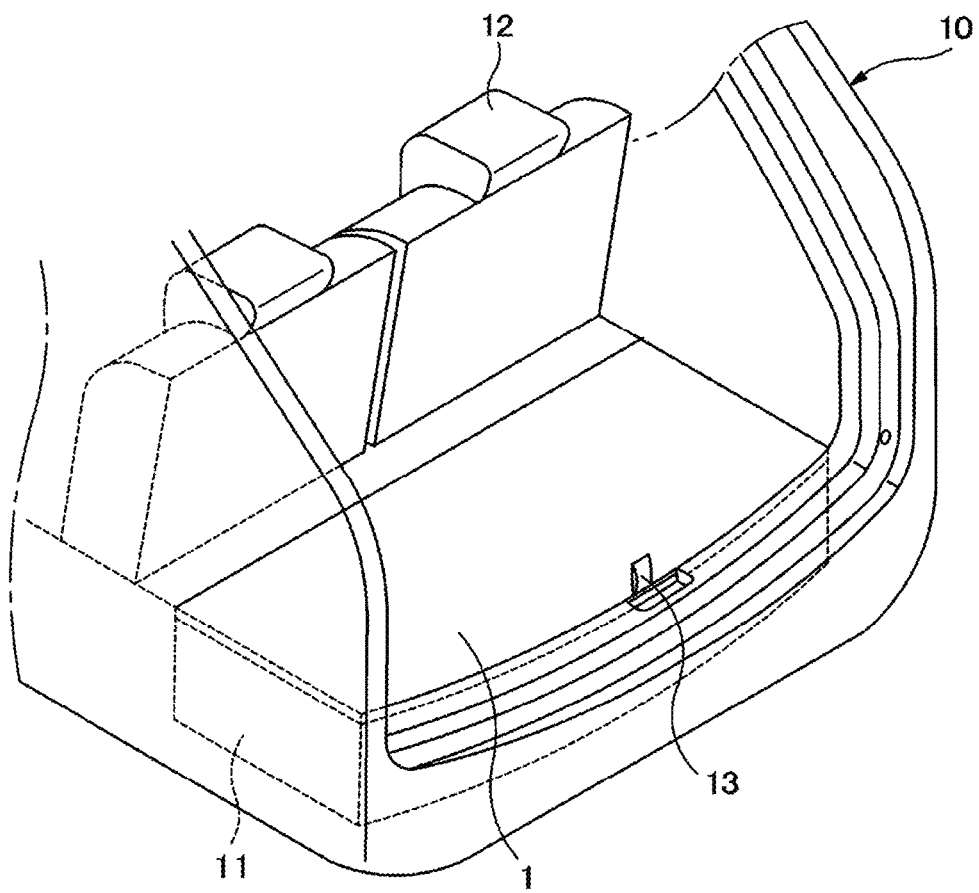
FIG. 1 is a schematic perspective view showing a luggage room board installed in a luggage room of a vehicle.

As shown in FIG. 1, a luggage room board 1 of the present embodiment is used as a luggage room board installed in a luggage room 11 of an automobile 10. The luggage room 11 is provided behind a rear seat 12 of the automobile 10, and a higher floor surface is formed by installing the luggage room board 1 so as to close an opening 11a of the luggage room 11.

Further, a strap 13 is attached to one end edge of the luggage room board 1 of the present embodiment, and the luggage room board 1 installed on the opening 11a of the luggage room 11 can be easily opened and closed by pulling the strap 13.

Figure 2:
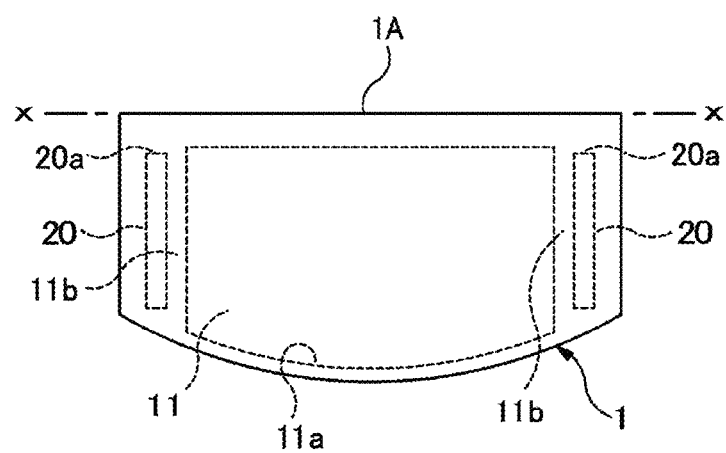
FIG. 2 is a schematic plan view of the luggage room board as viewed from a front surface side.
Figure 3:
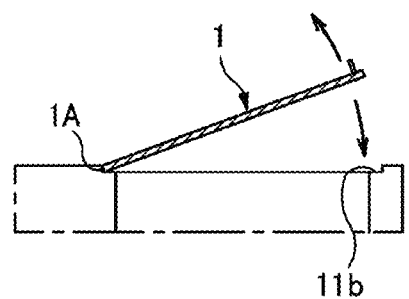
FIG. 3 shows opening and closing operation of the luggage room board.

As shown in FIG. 2, the luggage room board 1 is a plate-shaped member having a shape corresponding to the shape of the opening 11a of the luggage room 11 and is opened and closed by pulling the strap 13, as shown in FIG. 3. In other words, the luggage room board 1 is opened and closed using one of its edges as the center of rotation. Therefore, in the present embodiment, a rotation center line serving as the rotation center of the luggage room board 1 (x-x line in FIG. 2) substantially coincides with one edge 1A of the luggage room board 1.

The luggage room board 1 is attached so as to close the opening 11a of the luggage room 11, as described above. As shown in FIG. 2, a receiving portion 11b, which is lower by the thickness of the luggage room board 1, is formed along the opening 11a at the periphery of the opening 11a. When the luggage room board 1 is attached, a back surface of the luggage room board 1 is supported by this receiving portion 11b.

Figure 4:
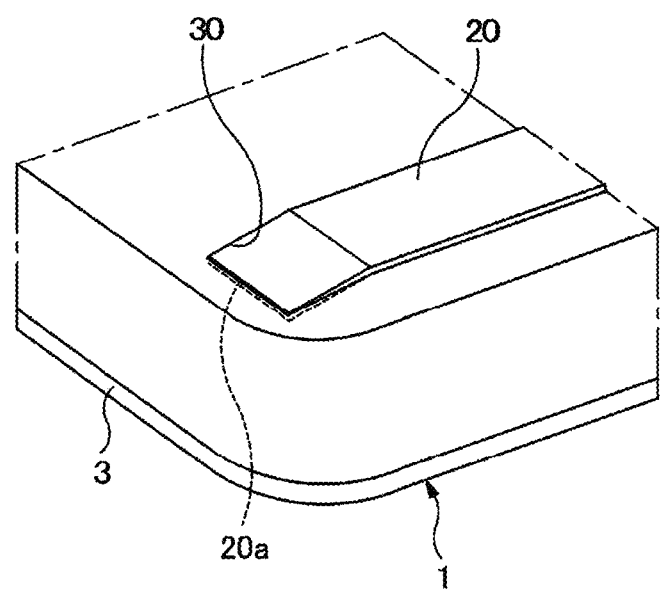
FIG. 4 is a schematic perspective view of the vicinity of an end of a non-woven fabric attached to a luggage room board main body as viewed from a back surface side.
Figure 5:
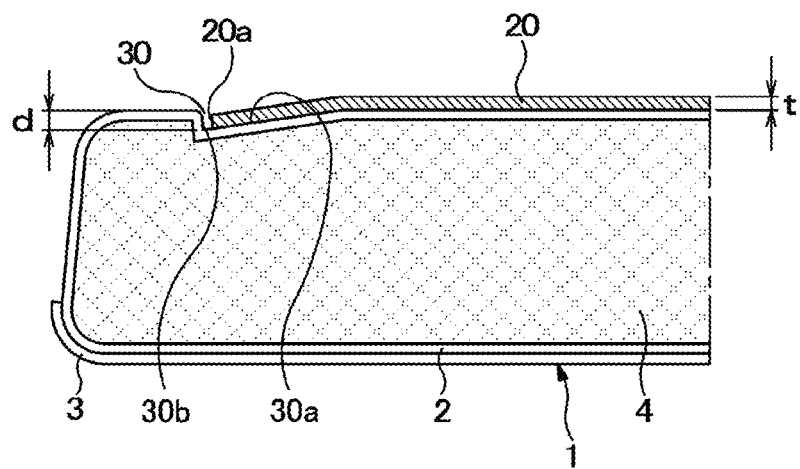
FIG. 5 is a schematic cross-sectional view showing the vicinity of the end of the non-woven fabric attached to the luggage room board main body.

Next, the configuration of the luggage room board 1 is described. As shown in FIG. 4 and FIG. 5, the luggage room board 1 includes a luggage room board main body 2 formed of a plate-shaped hollow molded body made of resin and a skin material 3 attached to a front surface. Further, a core material 4 is arranged inside the luggage room board main body 2 formed of the plate-shaped hollow molded body.

The luggage room board main body 2 includes, for example, a front surface wall and a back surface wall. A polyolefin resin or the like is used as a resin material forming the luggage room board main body 2. Examples of the polyolefin resin include polypropylene resin and polyethylene resin, and it is also preferable to use a blend of propylene homopolymer having a long chain branched structure and propylene homopolymer having a linear chain structure which have different melt flow rates.

The resin material is not limited to the polyolefin resin. Any resin material, for example, acrylic resin, polyamide resin, polyester resins, such as polynaphthalene terephthalate (PEN) resin, polycarbonate resin, polystyrene resin, acrylonitrile-butadiene-styrene (ABS) resin, acrylonitrile-styrene (AS) resin, polyvinylidene chloride resin, polyvinyl chloride resin, polyvinyl alcohol resin, polybutylene terephthalate (PBT) resin, and a resin obtained by blending these resins may be used.

Further, as a thermoplastic resin forming the luggage room board main body 2, for example, SBS resin (styrene-butadiene-styrene copolymer), SEBS resin (styrene-ethylene-butadiene-styrene copolymer) and the like may be blended with the above-mentioned polyolefin resin, whereby the impact resistance of the luggage room board 1 can be improved. Further, the luggage room board main body 2 may be formed of a foamed resin.

A reinforcing material may be embedded in a hollow portion of the hollow molded body forming the luggage room board main body 2, and reinforcing ribs may be formed on the front surface wall and the back surface wall. The reinforced structure may be achieved by forming an inner rib extending from the back surface wall to the front surface wall inside the hollow portion.

As the skin material 3 attached to the front surface of the luggage room board main body 2, for example, a relatively thick skin material made of a so-called napped material (for example, tufted carpet) can be used. The tufted carpet is made by inserting a loop-shaped or cut-shaped pile yarns into a base fabric and coating a back surface with adhesive to fix the pile yarns so that they do not come off.

Alternatively, natural fibers, such as cotton, hemp, wool, and silk, regenerated fibers, such as cuprammonium rayon, semi-synthetic fibers, such as acetate and rayon, synthetic fibers, such as nylon, polyester, acrylic, vinylon, polypropylene and polyurethane, and fiber sheets, such as knitted fabrics, woven fabrics, and non-woven fabrics obtained by processing these blended fibers can also be used.

The core material 4 is, for example, a foamed body formed of thermoplastic resin. The resin material forming the core material 4 is not particularly limited, and examples include polyolefins, such as polypropylene and polyethylene, any of acrylic derivatives, such as polyamide, polystyrene, and polyvinyl chloride, or a mixture of two or more of these. The foaming ratio of the foamed body used for the core material 4 is not particularly limited, but is, for example, 1.5 to 60 times.

Here, the skin material 3 is attached to only one surface (upper surface) of the luggage room board main body 2. In FIG. 4, the luggage room board 1 is shown with the front and back reversed, and it appears that the skin material 3 is attached to a lower surface. However, the skin material 3 is actually attached to the upper surface of the luggage room board 1 in the usage mode. With such a configuration, when the luggage room board 1 is installed over the opening 11*a* of the luggage room 11, the higher floor surface is covered with the skin material 3. Consequently, the floor surface formed of the luggage room board 1 has a shock-absorbing effect and also has a luxurious appearance.

If the skin material 3 is attached only to the front surface (upper surface) of the luggage room board main body 2, the luggage room board main body 2 made of resin exposed on the back surface of the luggage room board 1 comes into direct contact with the receiving portion 11*b* formed around the opening 11*a* when opening and closing the luggage room board 1. Since the luggage room board main body 2 made of resin is hard and does not have cushioning properties, it will be subjected to impact when it comes into direct contact, which may cause problems, such as impact noise, or in extreme cases, damage.

For this reason, in the luggage room board 1 of the present embodiment, a tape-shaped non-woven fabric 20 is attached to the luggage room board main body 2 on the back surface of the luggage room board 1 and is used as a cushioning material. The tape-shaped non-woven fabric 20 is attached at a position facing the receiving portion 11*b* formed around the opening 11*a* of the luggage room 11, as shown in FIG. 2. In the present embodiment, the tape-shaped non-woven fabrics are attached along two sides orthogonal to the rotation center line serving as the rotation center of the luggage room board 1 (the edge 1A of the luggage room board 1, x-x line in FIG. 2).

The tape-shaped non-woven fabric 20 is made of, for example, natural fibers, such as cotton, hemp, wool, and silk, regenerated fibers, such as cuprammonium rayon, semi-synthetic fibers, such as acetate and rayon, synthetic fibers, such as nylon, polyester, acrylic, vinylon, polypropylene and polyurethane, or a material obtained by processing these blended fibers, and has excellent cushioning properties because it is a sheet of fibers.

The tape-shaped non-woven fabric 20 is attached to the luggage room board main body 2 using an adhesive or the like. However, it is in the form of a tape protruding from the luggage room board main body 2, and thus it is easily affected by external pressure and has a problem of being easily rolled up and peeled off from its end. If some force is unintentionally applied to the end of the tape-shaped non-woven fabric 20, the adhesive force or bonding force may be insufficient, which will trigger the peeling off, and the non-woven fabric 20 will be peeled off from the end. In particular, the tape-shaped non-woven fabrics 20 are attached along the two sides orthogonal to the rotation center line, there is a high possibility of unintentional force being applied to ends 20*a* on a side of the rotation center line, and they will be rolled up and peeled off from the edges.

In order to solve such inconveniences, the luggage room board 1 of the present embodiment is provided with concave portions 30 on the luggage room board main body 2 at positions corresponding to the ends 20*a* of the non-woven fabrics 20 on the side of the rotation center line, as shown in FIG. 4 and FIG. 5, and the non-woven fabric 20 is attached so that the end 20*a* enters the concave portion 30. The concave portion 30 can be easily formed by adjusting the shape of a mold when molding the luggage room board main body 2.

The concave portion 30 is formed to have a width slightly larger than a width of the tape-shaped non-woven fabric 20 and is formed such that its depth gradually increases toward the end 20*a* of the non-woven fabric 20. Therefore, a bottom 30*a* of the concave portion 30 is an inclined surface.

Further, as shown in FIG. 5, a depth d of the concave portion 30 at the end 20*a* of the non-woven fabric 20 is set to be approximately the same as a thickness t of the non-woven fabric 20. An inner wall 30*b* of the concave portion 30 faces the end surface of the non-woven fabric 20. This makes it difficult to be affected by external pressure and can prevent the end 20*a* of the non-woven fabric 20 from protruding and rolling up.

In this regard, although the concave portion 30 in the present embodiment is provided only at the position corresponding to the end 20a of the tape-shaped non-woven fabric 20 on the side of the rotation center line, the concave portion 30 may be provided at the position corresponding to both ends of the non-woven fabric 20. By providing the concave portions 30 corresponding to both ends of the non-woven fabric 20, the rolling up of the non-woven fabric 20 at both ends can be reliably prevented. On the other hand, the end 20a on the side of the rotation center line is easily affected by external pressure, and thus the rolling up at the position easily affected by external pressure can be reliably prevented by forming the concave portion 30 only on this side. In addition, the other end of the non-woven fabric 20 protrudes, and this has the advantage of maximizing the cushioning effect.

The formation of the concave portion 30 is also effective in improving the strength around the concave portion 30. This is because the core material 4 inserted in the luggage room board main body 2 is compressed as a result of the formation of the concave portion 30, which leads to a decrease in the foaming ratio of the core material 4 formed of a foamed body and an increase in its strength. The reason for this will be described below based on a molding method of the luggage room board 1.

Figure 6:
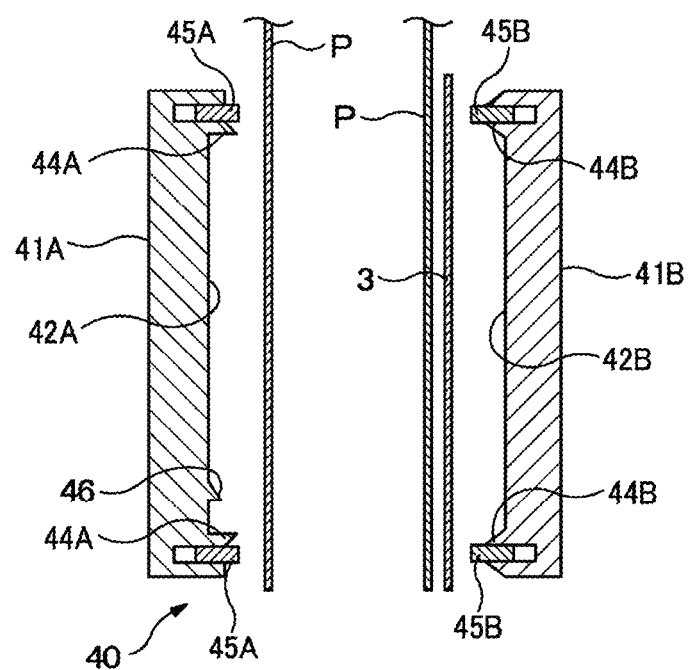
FIG. 6 is an explanatory diagram of a molding step of the luggage room board and shows a state where molten resin sheets are suspended.
Figure 7:
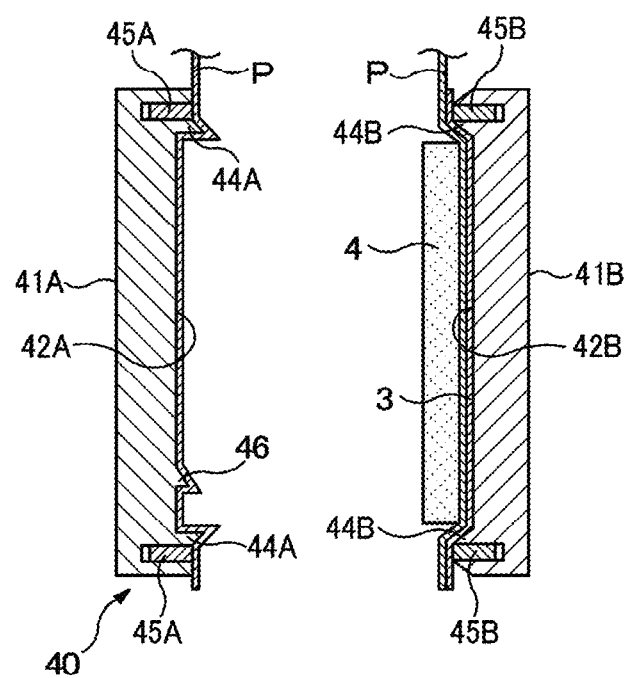
FIG. 7 is an explanatory diagram of the molding step of the luggage room board and shows a state where a core material is inserted.

FIG. 6 and FIG. 7 are explanatory diagrams of the luggage room board main body 2 of the luggage room board 1 of the present embodiment.

Referring to FIG. 6, a mold clamping device 40 includes a pair of split molds 41A, 41B which are moved between an open position and a closed position in a direction substantially orthogonal to molten resin sheets P, P extruded vertically downward from an extruder (not shown). The pair of split molds 41A, 41B are arranged with their corresponding forming surfaces 42A, 42B facing each other. The forming surfaces 42A, 42B have a shape corresponding to the front surface and the back surface of the luggage room board 1, and a convex portion 46 is formed on the forming surface 42A corresponding to the back surface to form the concave portion 30.

In each of the pair of split molds 41A, 41B, pinch-off portions 44A, 44B are formed near an upper and lower ends of the forming surfaces 42A, 42B corresponding to each of the molds. These pinch-off portions 44A, 44B are formed in an annular shape around the forming surfaces 42A, 42B, respectively, and protrude toward the opposing split molds 41B, 41A, respectively. Consequently, when the pair of split molds 41A, 41B are clamped, tips of the pinch-off portions 44A, 44B come into contact with each other, and a parting line is formed on the periphery of the molten resin sheets P, P.

Sliding portions 45A, 45B capable of protruding from the forming surfaces 42A, 42B are provided around the forming surfaces 42A, 42B of the pair of split molds 41A, 41B. End surfaces of the sliding portions 45A, 45B in a state of protruding from the forming surfaces 42A, 42B are brought into contact with the molten resin sheets P, P, whereby an enclosed space is formed between the molten resin sheets P, P and the forming surfaces 42A, 42B of the pair of split molds 41A, 41B.

A vacuum chamber (not shown) is built into the pair of split molds 41A, 41B. The vacuum chamber is connected to a vacuum pump and a vacuum tank (both not shown). A communication passage (not shown) for vacuum suction is provided between the vacuum chamber and the forming surfaces 42A, 42B.

The pair of split molds 41A, 41B are driven by a mold driving device (not shown) to move between the open position and the closed position. In the open position, two continuous molten resin sheets P, P can be arranged at a distance from each other between the pair of split molds 41A, 41B. The two molten resin sheets P, P become the luggage room board main body 2 of the luggage room board 1 after molding. In the closed position, the pinch-off portions 44A, 44B of the pair of split molds 41A, 41B come into contact with each other.

To form the luggage room board 1, as shown in FIG. 6, the molten resin sheets P, P are first extruded vertically downward from the extruder and are fed between the forming surfaces 42A, 42B of the pair of split molds 41A, 41B. At this point, the pair of split molds 41A, 41B are in the open position.

Next, the sliding portions 45A, 45B around the forming surfaces 42A, 42B protrude, and their end surfaces are brought into contact with the molten resin sheets P, P. Consequently, the enclosed space is formed between the molten resin sheets P, P and the forming surfaces 42A, 42B of the pair of split molds 41A, 41B. Then, air in the enclosed space is sucked out through the communication passage provided between the vacuum chamber and the forming surfaces 42A, 42B. This suction causes the two molten resin sheets P, P to be pressed respectively against the forming surfaces 42A, 42B of the pair of split molds 41A, 41B, and the sheets are shaped (formed) into a shape along the forming surfaces 42A, 42B, that is, the rough outline of the luggage room board main body 2, as shown in FIG. 7.

At this time, on a side of the split mold 41B, the skin material 3 is inserted between the molten resin sheet P and the forming surface 42B of the split mold 41B and is attached to one side (front surface) of the luggage room board main body 2.

Next, a manipulator (not shown) is used to position the core material 4 between the pair of split molds 41A, 41B and insert it by pressing it against one of the split molds (the split mold 41B in FIG. 7) from a side, as shown in FIG. 7. Consequently, the core material 4 is welded to one of the molten resin sheets P, and the core material 4 is arranged between the pair of molten resin sheets P pressed against the forming surfaces 42A, 42B.

The pair of split molds 41A, 41B are then moved from the open position to the closed position and are clamped. Consequently, the core material 4 that has been welded to one of the molten resin sheets P (on a right side of FIG. 7) is welded to the other molten resin sheet P (on a left side of FIG. 7). Further, the peripheral edges of the pair of molten resin sheets P, P are welded on the pinch-off portions 44A, 44B of the pair of split molds 41A, 41B to form the parting line PL.

Finally, the pair of split molds 41A, 41B are moved to the open position again. The formed luggage room board 1 is separated from the forming surfaces 42A, 42B, and burrs formed around the parting line PL are cut and removed using a cutter or the like. The luggage room board 1 is then completed. In this regard, although the molten resin sheets P are pressed by suction against the forming surfaces 42A, 42B of the pair of split molds 41A, 41B in the above-described molding method of the luggage room board 1, the method is not limited thereto. The molten resin sheet P may be pressed against the forming surfaces 42A, 42B of the pair of split molds 41A, 41B by blowing fluid, such as air, onto the molten resin sheet P (blow molding).

Figure 8A:
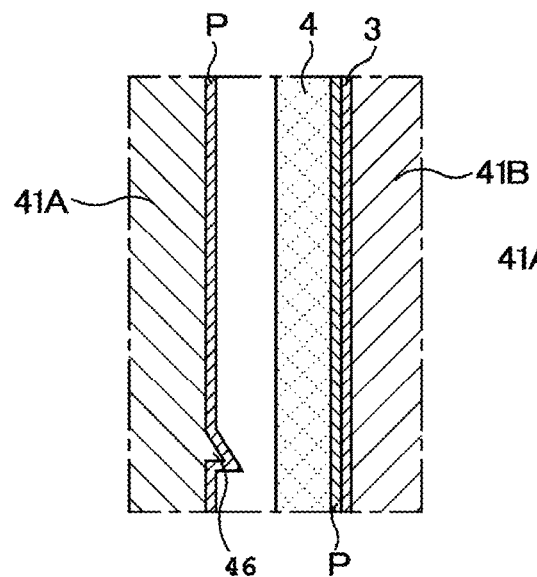
FIG. 8A and FIG. 8B are explanatory diagrams of the compression of the core material by forming a concave portion.
Figure 8B:
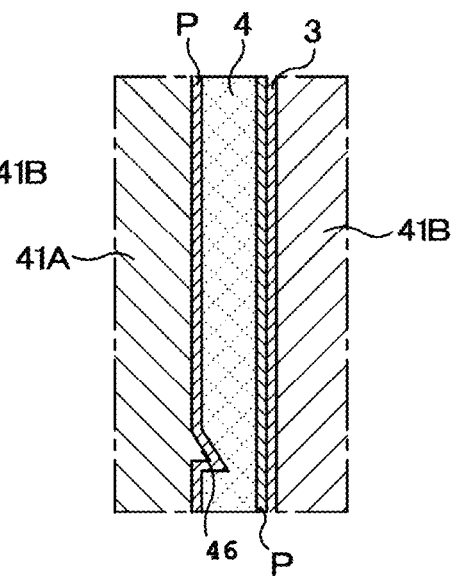

In the luggage room board 1 formed by the molding method described above, the convex portion 46 for forming the concave portion 30 is formed on the forming surface 42 of the split mold 41AA, and the core material 4 is compressed by this convex portion 46 (by the molten resin sheet P molded by this convex portion 46). FIG. 8A shows a state before molding, and FIG. 8B shows a state after molding. As shown in FIG. 8B, after molding, the core material 4 is compressed by the convex portion 46 (by the molten resin sheet P molded by this convex portion 46). Therefore, the foaming ratio of the core material 4 formed of a foamed body decreases in this portion, resulting in increased strength of the core material 4 and improved strength around the concave portion 30. Further, by improving the strength around the concave portion 30, the non-woven fabric 20 can be easily attached to the concave portion 30 and is less likely to be peeled off after the attachment.

As described above, since the tape-shaped non-woven fabric 20 is attached to the back surface of the luggage room board main body 2 in the luggage room board 1 of the present embodiment, the non-woven fabric 20 serves as a cushioning material to reduce the impact when opening and closing the luggage room board 1. Further, at the end 20a of the non-woven fabric 20, the concave portion 30 is provided on the surface of the luggage room board main body 2 to which the non-woven fabric 20 is attached, and the end 20a of the non-woven fabric 20 is attached so as to enter the concave portion 30, so that the tape-shaped non-woven fabric 20 is prevented from being rolled up and peeled off. Further, the formation of the concave portion 30 is also effective in improving the strength of the luggage room board 1.

(Embodiment of Second Invention)
<Resin Panel of Second Invention>

The present disclosure relates to a resin panel. One example is a resin panel including at least a first region in which a core material is accommodated, a second region having a predetermined rigidity without accommodating the core material, and a third region connecting the first region and the second region.

Figure 9:
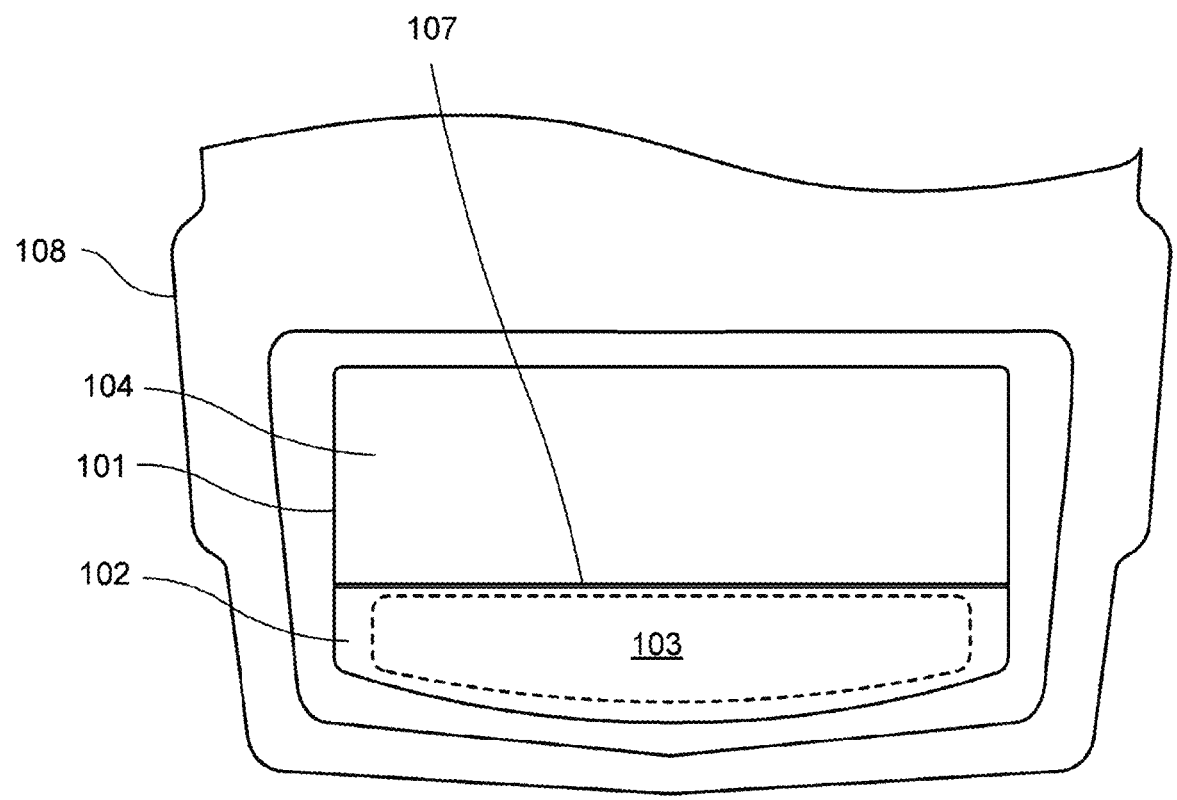
FIG. 9 shows an example of the use of a resin panel 101 in various embodiments of a second invention of the present application.

FIG. 9 shows one example of a use of a resin panel 101 according to various embodiments of the present disclosure. Specifically, FIG. 9 shows the resin panel 101 including a first region 102 in which a core material is accommodated, a second region 104 in which the core material is not accommodated, and a third region 107 connecting the first region 102 and the second region 104.

The resin panel 101 is used, for example, as a luggage room board for a vehicle. As shown in FIG. 9, the resin panel 101 is arranged to cover a luggage room located at the rear of a vehicle 108. Here, for example, the first region 102 in which the core material is accommodated is arranged in a position to cover an accommodation space 103 formed in the luggage room. Since the first region 102 accommodates the core material inside, it can easily support the load in the direction of gravity. Further, the second region 104 is arranged in a position to cover a region other than the accommodation space 103, that is, a region where the floor of the luggage room is formed. Since the second region 104 has a predetermined rigidity without including the core material, it is thinner and can serve as a decorative panel. Further, the third region 107 serves as a hinge, so that the first region 102 serves as a lid that can be opened upward.

In this regard, FIG. 9 shows an example of using the resin panel 101 as the luggage room board of the vehicle, and the applications of the resin panel are not limited thereto. For example, the resin panel 101 can be used for a variety of applications including interior materials, exterior materials, reinforcement materials, decorative materials, and heat insulation materials for transportation equipment, such as passenger cars, trucks, trains, aircraft, and ships, building structures, such as houses, buildings, and other structures, and mass-produced products, such as toys for personal use, amusement machines for stores, sporting goods, and leisure goods.

<First Embodiment of Second Invention>
[Configuration of Resin Panel 110]
1. Overview of Configuration of Resin Panel 110

Figure 10:
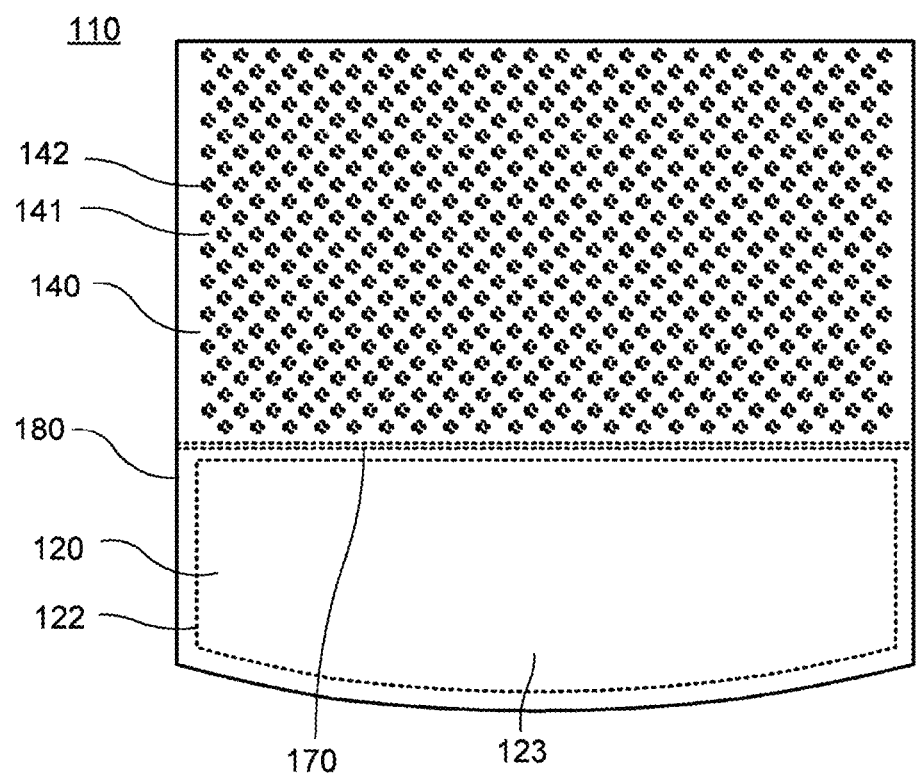
FIG. 10 is an overall view showing a configuration of an upper surface of the resin panel 110 according to a first embodiment of the second invention of the present application.
Figure 11:
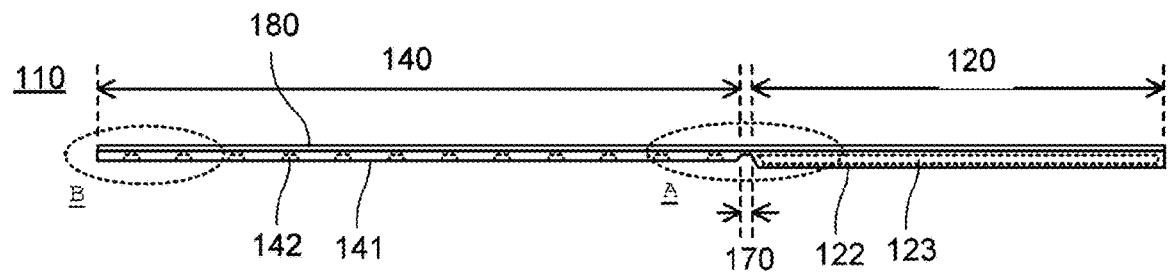
FIG. 11 is a side view showing a configuration of a side surface of the resin panel 110 according to a first embodiment of the second invention of the present application.

FIG. 10 is an overall view showing a configuration of an upper surface of the resin panel 110 according to a first embodiment of the present disclosure. Further, FIG. 11 is a side view showing a configuration of a side surface of the resin panel 110 according to the first embodiment of the present disclosure. According to FIG. 10 and FIG. 11, the resin panel 110 includes a first region 120, a second region 140, a third region 170 connecting the first region 120 and the second region 140, and a skin material 180 laminated to cover these regions. The first region 120 accommodates a core material 122 over the substantially entire region of an accommodation space 123 formed therein. Further, the second region 140 has a reinforced structure (the concave portion 142) of a predetermined shape over its entire area, instead of accommodating the core material inside. The third region 170 is connected to the first region 120 at one end and to the second region 140 at the other end and connects the first region 120 and the second region 140. In the present embodiment, the third region 170 is formed thinner than the other regions to enable the resin panel 110 to be bent in the region.

In the present embodiment, the first region 120, the second region 140 and the third region 170 are integrally molded with resin. That is, for example, the first region 120, the second region 140, and the third region 170 are continuously formed by injection molding or other methods using a molten resin material. Thermoplastic resin, such as polyolefin, is used as the resin for integrally molding the regions. As the thermoplastic resin, low density polyethylene, linear low density polyethylene, high density polyethylene, polypropylene, ethylene-propylene copolymer, vinyl acetate copolymer, polyvinyl chloride, ABS, polyamide, polystyrene, polyester, polycarbonate, modified polyphenylene ether can be used alone or in a mixture of two or more resins. In addition to these main components, additives, such as glass fiber, carbon fiber, calcium carbonate, talc, mica, stabilizers, colorants, antistatic agents, and flame retardants can be added as appropriate.

2. Configuration of First Region 20

Figure 12:
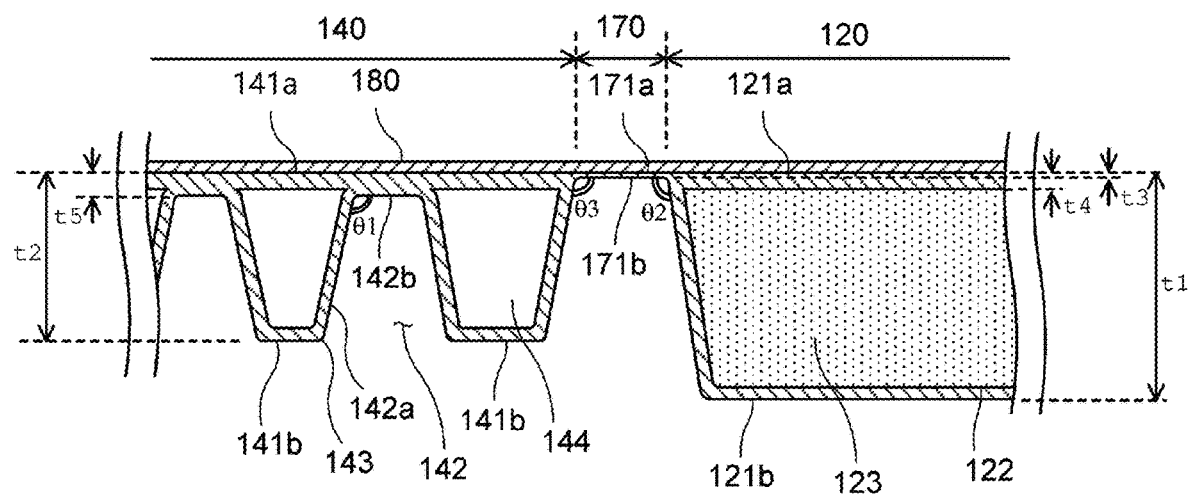
FIG. 12 is a schematic diagram of a cross section around a third region 170 of the resin panel 110 according to the first embodiment of the second invention of the present application.

FIG. 12 is a schematic diagram of a cross section around the third region 170 of the resin panel 110 according to the first embodiment of the present disclosure. Specifically, FIG. 12 schematically shows the cross-sectional structure of the portion enclosed by a broken line A in FIG. 11. According to FIG. 12, in the first region 120, a first front side layer 121a and a first back side layer 121b are arranged to face each other. The first front side layer 121a and the first back side layer 121b are both formed of resin and are integrally formed by welding their peripheral edges. By welding the peripheral edges, the accommodation space 123 is formed between the first front side layer 121a and the first back side layer 121b. The core material 122 is accommodated in the accommodation space 123 to provide rigidity to the first region.

Here, in one example, a thickness t1 connecting the outer surface of the first front side layer 121a and the outer surface of the first back side layer 121b of the first region 120 is larger than a thickness t2 connecting an outer surface of a second front side layer 141a and the outer surface of the second back side layer 141b of the second region 140, and a thickness t3 connecting a front surface 171a and a back surface 171b of the third region 170. Specifically, the thickness t1 is formed to be 1.1 to 5 times larger, preferably 1.2 to 3 times larger, and more preferably 1.3 to 2 times larger than the thickness t2. In this regard, although the thickness t1 can be formed at the thickness described above when used as the luggage room board of FIG. 9, it can be adjusted as needed depending on the application of the resin panel, the degree of rigidity to be provided, resin raw material, raw material of the core material 122 and the like.

A foamed body is mainly used for the core material 122. In the present embodiment, a foamed body that is molded into a shape including an upper surface, a lower surface facing the upper surface, and side surfaces connecting the upper surface and the lower surface is used as the core material 122, and the foamed body is evenly accommodated in the entire area of the accommodation space 123 formed by the first front side layer 121a and the first back side layer 121b. Although not specifically shown in the drawings, in order to provide a higher support function for loads in a thickness direction or gravity direction, it is also possible to use the core material 122 that has been processed into a desired shape, such as one with a recess (concave portion) in the thickness direction or gravity direction and one employing a honeycomb structure with holes. Further, in addition to the core material 122, various reinforcing materials or reinforcing structures can be arranged in the accommodation space 123.

In this regard, as the materials used for the core material 122, thermoplastic resin, such as polyolefins which are homopolymers or copolymers of ethylene, propylene, isoprenepentene, methylpenten and the like, polyamide, polystyrene, polyvinyl chloride, polyacrylonitrile, acrylic derivatives, polycarbonate, vinyl acetate copolymer, ionomer, ethylene-propylene copolymer, acrylonitrile-styrene copolymer, ABS, polyphenylene oxide, polyacetal, thermoplastic polyimide, and thermosetting resin, such as phenol resin, melamine resin, epoxy resin, polyurethane, and thermosetting polyimide can be used alone or in a mixture of two or more resins. Further, in addition to these resin materials, additives, such as glass fiber, carbon fiber, calcium carbonate, talc, mica, stabilizers, coloring agents, antistatic agents, flame retardants, and the like can be added to the core material 122. Further, the core material 122 is formed of the above resin materials, and a foaming agent can be added to form it as a foamed body.

3. Configuration of Second Region 140

According to FIG. 12, in the second region 140, the second front side layer 141a and a second back side layer 141b are arranged to face each other. The second front side layer 141a and the second back side layer 141b are both formed of resin and are integrally formed by welding at least their peripheral edges. Here, the second back side layer 141b has a plurality of openings 143 at predetermined intervals. In each of the openings 143, a concave portion 142 is formed from each opening 143 toward the second front side layer 141a. The concave portions 142 includes a top 142b formed at a predetermined distance from the opening 143 of the second back side layer 141b and a wall portion 142a connecting the opening 143 and the top 142b. Therefore, the concave portion 142 having the wall portion 142a makes it possible to provide a predetermined rigidity against a load in the thickness direction connecting the second front side layer 141a and the second back side layer 141b.

In the present embodiment, the opening 143 and the top 142b are formed in a substantially circular shape, and the area of the opening 143 is larger than the area of the top 142b. Therefore, the wall portion 142a connecting the opening 143 and the top 142b forms an inclined surface, and a cross section of the concave portion 142 has an inverted mortar shape (trapezoidal shape). Here, an inclination angle θ1 of the wall portion 142a (here, the angle between the top 142b and the wall portion 142a) is 90 to 135 degrees, preferably 90 to 125 degrees, and more preferably 90 to 110 degrees. However, the shape is not limited thereto, and the area of the top 142b may be larger than that of the opening 143 so that the cross section of the concave portion 142 has a mortar shape. Further, it is also possible to make the area of the opening 143 and the top 142b approximately the same so that the concave portion 142 has a rectangular cross section.

In addition to the peripheral edges of the second front side layer 141a and the second back side layer 141b, the top 142b of the concave portion 142 is also welded to the second front side layer 141a. Therefore, the region where the top 142b is welded is formed to be thicker than the other regions of the second front side layer 141a. Further, the second region 140 has a hollow portion 144 which is formed by the region other than the region where the top 142b of the second front side layer 141a is welded, the second back side layer 141b, and the wall portion 142a. In the present embodiment, as described above, the concave portion 142 having the wall portion 142a is formed in the second region 140. Therefore, although the hollow portion 144 does not accommodate any core material or other contents, it is possible to provide the second region 140 with a predetermined rigidity against loads in the thickness direction connecting the second front side layer 141a and the second back side layer 141b.

Further, the thickness t2 connecting an outer surface of the second front side layer 141a and an outer surface of the second back side layer 141b of the second region 140 is smaller than the thickness t1 connecting the outer surface of the first front side layer 121a and the outer surface of the first back side layer 121b of the first region 120 and is larger than the thickness t3 connecting the front surface 171a and the back surface 171b of the third region 170. Specifically, the thickness t2 is formed such that the thickness t1 is 1.1 to 5 times larger, preferably 1.2 to 3 times larger, and more preferably 1.3 to 2 times larger than the thickness t2. In this regard, although the thickness t2 can be formed at the thickness described above when used as the luggage room board of FIG. 9, it can be adjusted as needed depending on the application of the resin panel, the degree of rigidity to be provided, and resin raw material and the like.

Figure 13:
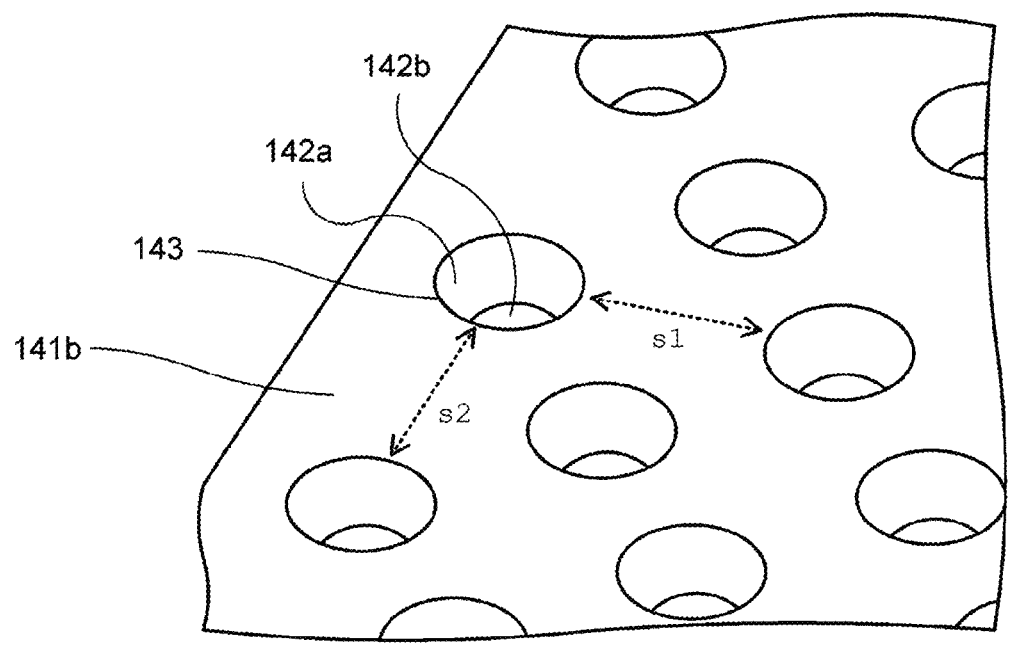
FIG. 13 is an enlarged perspective view of a lower surface side of an edge of a second region 140 of the resin panel 110 according to the first embodiment of the second invention of the present application.

Here, FIG. 13 is an enlarged perspective view of a lower surface side of an edge of the second region 140 of the resin panel 110 according to the first embodiment of the present disclosure. Specifically, FIG. 13 is an enlarged perspective view of the portion enclosed by a broken line B in FIG. 11 when viewed from below. According to FIG. 13, the openings 143 are formed in the substantially entire area of the second back side layer 141b of the second region 140 at predetermined intervals (s1 and s2) with respect to other adjacent openings 143. The concave portion 142 is formed from each of the openings 143 toward the second front side layer 141a. The opening 143 and the top 142b of the concave portion 142 in the present embodiment are formed in a circular shape. However, the shape is not limited thereto, and it is also possible to form them in a polygonal shape, such as a hexagon or octagon. Further, the shapes of the opening 143 and the top 142b do not necessarily correspond to each other, and the opening 143 and the top 142b may have different shapes.

Further, in the present embodiment, the plurality of concave portions 142 are spaced equally apart by s1 in the left-right direction and by s2 in the depth direction. However, the interval can be adjusted as desired, for example, by decreasing the intervals of the plurality of concave portions 142 toward the center of the second region 140 of the resin panel, or conversely, decreasing the intervals of the plurality of concave portions 142 toward the outer edge.

4. Configuration of Third Region 170

According to FIG. 12, the third region 170 is formed of a resin having the front surface 171a and the back surface 171b. One end of the third region 170 is connected to the vicinity of the peripheral edge where the first front side layer 121a and the first back side layer 121b of the first region 120 are welded. Further, the other end of the third region 170 is connected to the vicinity of the peripheral edge where the second front side layer 141a and the second back side layer 141b of the second region 140 are welded. Therefore, the third region 170 connects the first region 120 and the second region 140 at one end and the other end.

The first back side layer 121b of the first region 120 is connected to form a predetermined slope toward the back surface 171b of the third region 170. Further, the second back side layer 141b of the second region 140 is connected to form a predetermined slope toward the back surface 171b of the third region 170. The angle θ2 between the first back side layer 121b of the first region 120 and the back surface 171b of the third region 170 and the angle θ3 between the second back side layer 141b of the second region 140 and the back surface 171b of the third region 170 are each 90 to 160 degrees, preferably 90 to 135 degrees, and more preferably 90 to 120 degrees.

Here, the third region 170 can serve as a hinge to allow the first region 120 and the second region 140 to be bent with respect to each other. In such a case, the thickness t3 connecting the front surface 171a and the back surface 171b of the third region 170 is smaller than the thickness t1 connecting the outer surface of the first front side layer 121a and the outer surface of the first back side layer 121b of the first region 120 and the thickness t2 connecting the outer surface of the second front side layer 141a and the outer surface of the second back side layer 141b of the second region 140. Further, the thickness t3 is formed to be smaller than a thickness of the first front side layer 121a of the first region 120 and a thickness of the second front side layer 141a of the second region 140. Consequently, the third region 170 can serve as a hinge to allow the first region 120 and the second region 140 to be bent with respect to each other.

In this regard, the thickness t3 of the third region 170 is formed to be 0.9 times or less, preferably 0.5 times or less, and more preferably 0.2 times or less with respect to a thickness t4 of the first front side layer 121a of the first region 120. In this regard, the thickness t3 can be adjusted as needed depending on resin raw material, the presence or absence of the skin material and its material, the degree of bendability and the like.

5. Configuration of Skin Material 180

The skin material 180 is a member laminated on the regions to cover the first region 120, the second region 140, and the third region 170 and is formed on an outermost surface of the resin panel 110. Generally, the skin material 180 is used for the purpose of improving appearance and decorative properties, imparting desired surface characteristics (such as fire resistance) to the resin panel 110, and protecting articles in contact with the resin panel 110. Therefore, the skin material 180 does not have to be formed over the entire surface of the resin panel 110 and may be formed to cover only a part of the resin panel. Further, it is not always necessary to provide the skin material 180. In addition, the resin panel 110 may include another layer between the skin material 180 and the regions for the purpose of imparting desired properties.

For the skin material 180, it is possible to use a skin material having a desired shape, such as a fiber skin material, a sheet skin material, or a film skin material. Further, its material can be selected from synthetic fibers, such as polyester, polypropylene, polyamide, polyurethane, acrylic, vinylon, semi-synthetic fibers, such as acetate and rayon, regenerated fibers, such as viscose rayon and copper ammonia rayon, natural fibers, such as cotton, hemp, wool, and silk, or composite fibers of these. In addition, the form of the material may be non-woven fabric, woven fabric, knitted fabric, or their napped fabric.

[Manufacturing Method of Resin Panel 110]

1. Outline of Manufacturing Method

In the present embodiment, as described above, the resin panel 110 has a shape in which the first region 120 accommodating the core material 122 inside, the second region 140 having a predetermined rigidity without accommodating the core material, and the third region 170 connecting the first region 120 and the second region 140 are integrally molded with resin. The resin panel 110 is manufactured in one example by a method including the following steps.

[Step 1] an arrangement step of arranging two resin sheets in a molten state between a pair of split molds, which are arranged to face each other and movable between a mold clamping position and an open position, and at least one of which includes a first cavity corresponding to the first region 120 and a second cavity corresponding to the second region 140

[Step 2] a shaping step of shaping at least one of the resin sheets in the molten state along at least one of the split molds provided with the first cavity and the second cavity

[Step 3] an integration step of integrating a peripheral edge of at least one of the resin sheets after shaping and a peripheral edge of the other resin sheet with each other by moving the pair of split molds from the open position to the mold clamping position In this regard, the step 2 can include a step of forming an enclosed space between the first cavity and the second cavity and at least one of the resin sheets and sucking from the enclosed space. Further, a step of blowing air into the second region 140 can be included after the step 3.

2. Configuration of Molding Machine 200

Figure 14A:
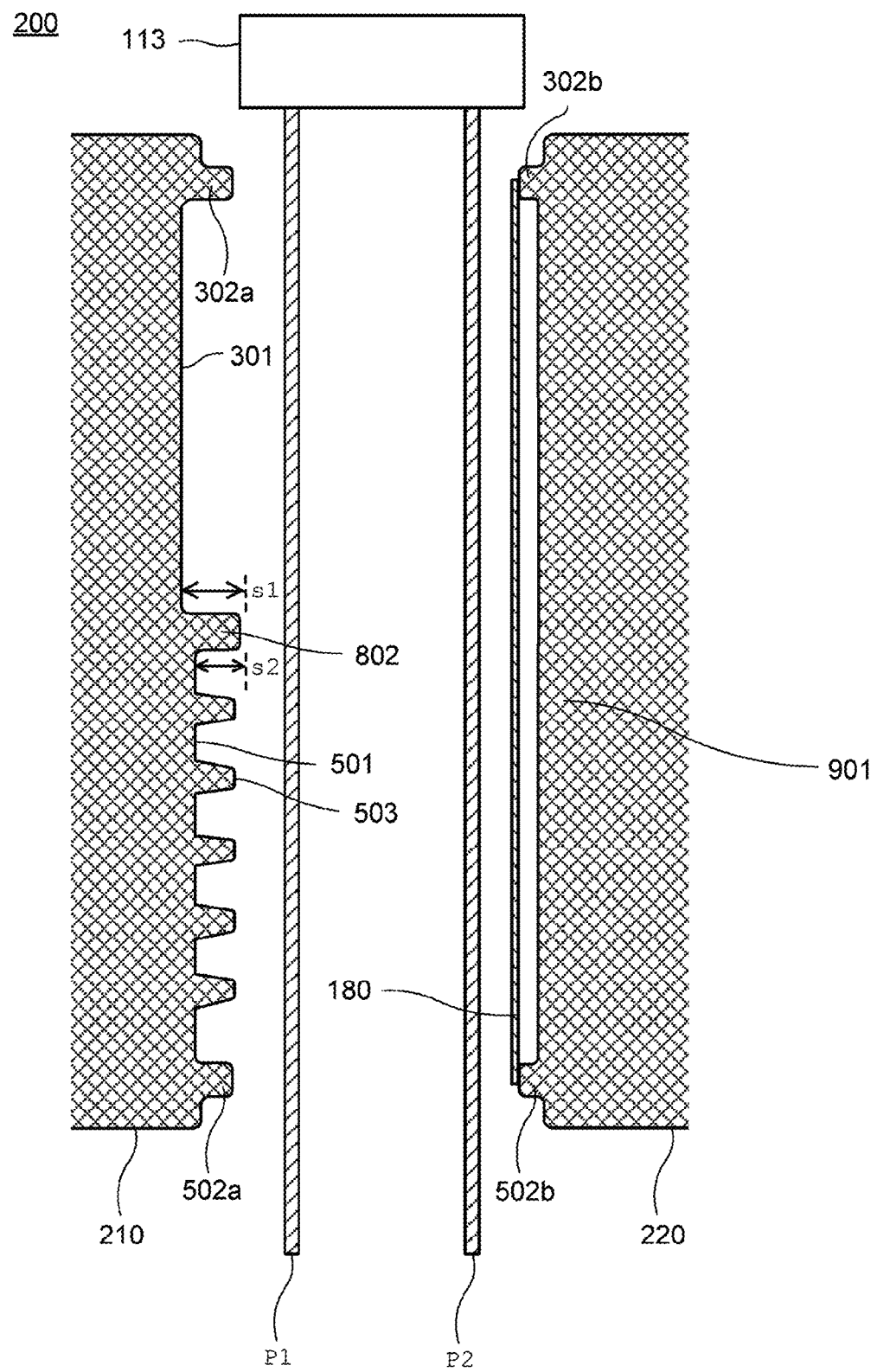
FIG. 14A is a schematic diagram showing a manufacturing method of the resin panel 110 according to the first embodiment of the second invention of the present application.

FIG. 14A is a schematic diagram showing a manufacturing method of the resin panel 110 of the first embodiment of the present disclosure. Specifically, it shows a state in which two resin sheets P1 and P2 in a molten state are arranged in the Step 1 between a first mold 210 including a first cavity 301 corresponding to the first region 120 and a second cavity 501 corresponding to the second region 140 and a second mold 220 that is arranged to face the first mold 210 and is movable relative to the first mold 210 between the mold clamping position and the open position.

According to FIG. 14A, a molding machine 200 has an extruder 113 including a hopper for feeding resin as raw material of the resin panel 110, a heater for heating and melting the fed raw material, a screw for kneading the molten resin, and a cylinder for extruding the kneaded molten resin in a direction toward the first mold 210 and the second mold 220.

Further, the molding machine 200 has the first mold 210 and the second mold 220, which are a pair of split molds that can be moved relative to each other between the mold clamping position and the open position. The first mold 210 includes the first cavity 301 surrounded by a standing wall 302*a* and a ridge 802 for shaping the first back side layer 121*b* of the first region 120 of the resin panel 110, the second cavity 501 surrounded by a standing wall 502*a* and the ridge 802 for shaping the second back side layer 141*b* of the second region 140 of the resin panel 110, and the ridge 802 formed between the first cavity 301 and the second cavity 501 to separate the cavities. Here, the first cavity 301 has no protrusions formed therein so that the hollow accommodation space 123 of the first region 120 of the resin panel 110 can be formed. On the other hand, the second cavity 501 has a plurality of convex portions 503 corresponding to positions of the plurality of concave portions 142 of the second region 140.

The second mold 220 has a third cavity 901 surrounded by a standing wall 302*b* and a standing wall 502*b* in order to shape the first front side layer 121*a* of the first region 120 of the resin panel 110, the second front side layer 141*a* of the second region 140, and the front surface 171*a* of the third region 170.

Here, the thickness t1 connecting the outer surface of the first front side layer 121*a* and the outer surface of the first back side layer 121*b* of the first region 120 of the resin panel 110 is formed to be larger than the thickness t2 connecting the outer surface of the second front side layer 141*a* and the outer surface of the second back side layer 141*b* of the second region 140 (FIG. 12). Therefore, the depth of the first cavity 301 corresponding to the first region 120 is formed to be larger than the depth of the second cavity 501 corresponding to the second region 140.

3. Step 1

In the Step 1, as shown in FIG. 14A, the first mold 210 and the second mold 220 are arranged to face each other and interpose, between the molds, the resin sheet P1 and the resin sheet P2 in the molten state that are suspended from an extruder 113. Here, the amount of molten resin to be suspended can be adjusted as appropriate according to the thickness of the resin panel after molding. Further, when the regions are covered with the skin material 180, the skin material 180 is arranged between the resin sheet P2 on a side of the second mold 220 and the second mold 220.

As raw materials for the resin sheet P1 and the resin sheet P2, thermoplastic resin, such as polyolefin, is used. As the thermoplastic resin, low density polyethylene, linear low density polyethylene, high density polyethylene, polypropylene, ethylene-propylene copolymer, vinyl acetate copolymer, polyvinyl chloride, ABS, polyamide, polystyrene, polyester, polycarbonate, modified polyphenylene ether can be used alone or in a mixture of two or more resins. In addition to these main components, additives, such as glass fiber, carbon fiber, calcium carbonate, talc, mica, stabilizers, colorants, antistatic agents, and flame retardants can be added as appropriate.

4. Step 2

Figure 14B:
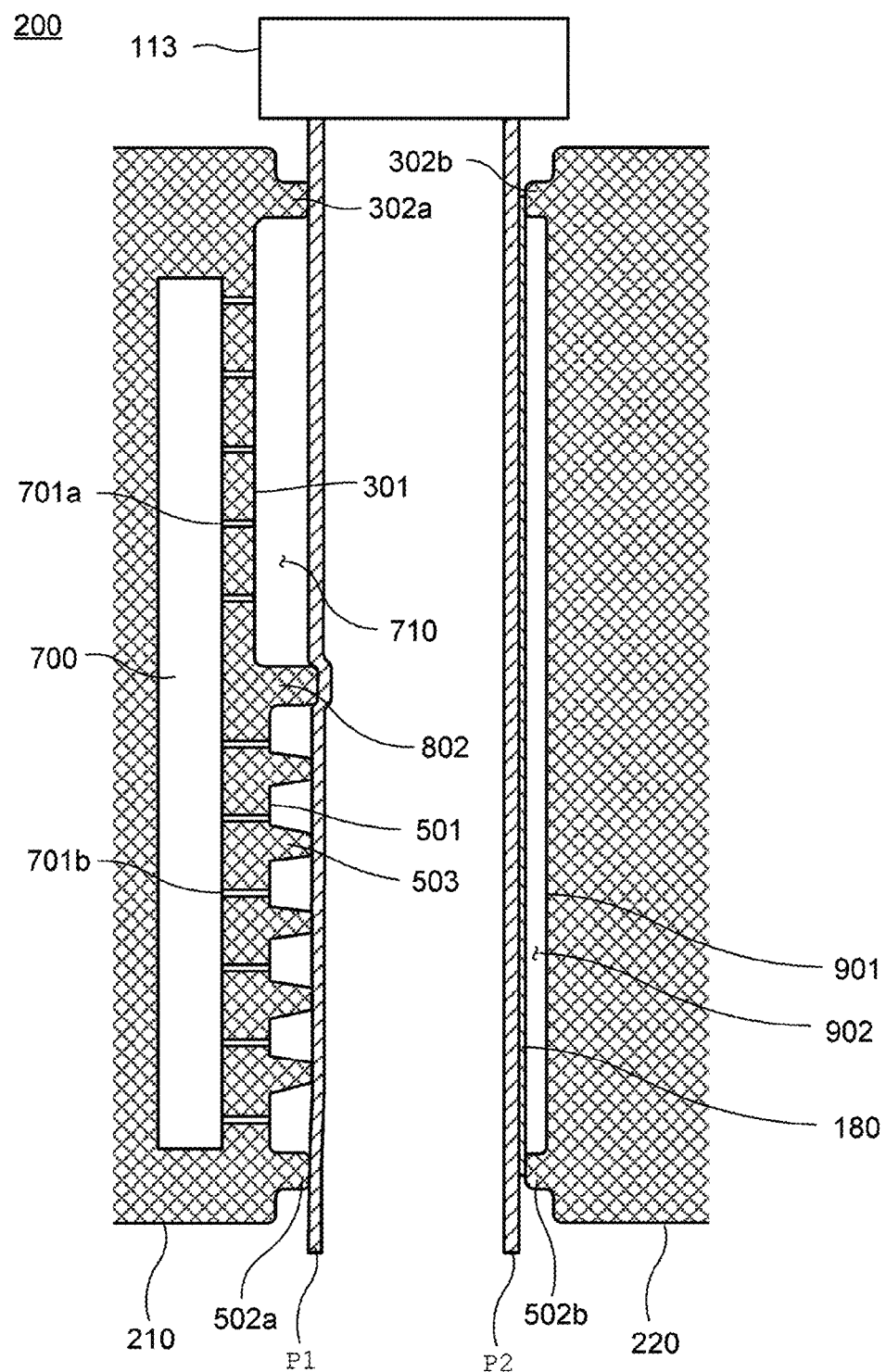
FIG. 14B is a schematic diagram showing the manufacturing method of the resin panel 110 according to the first embodiment of the second invention of the present application.
Figure 14C:
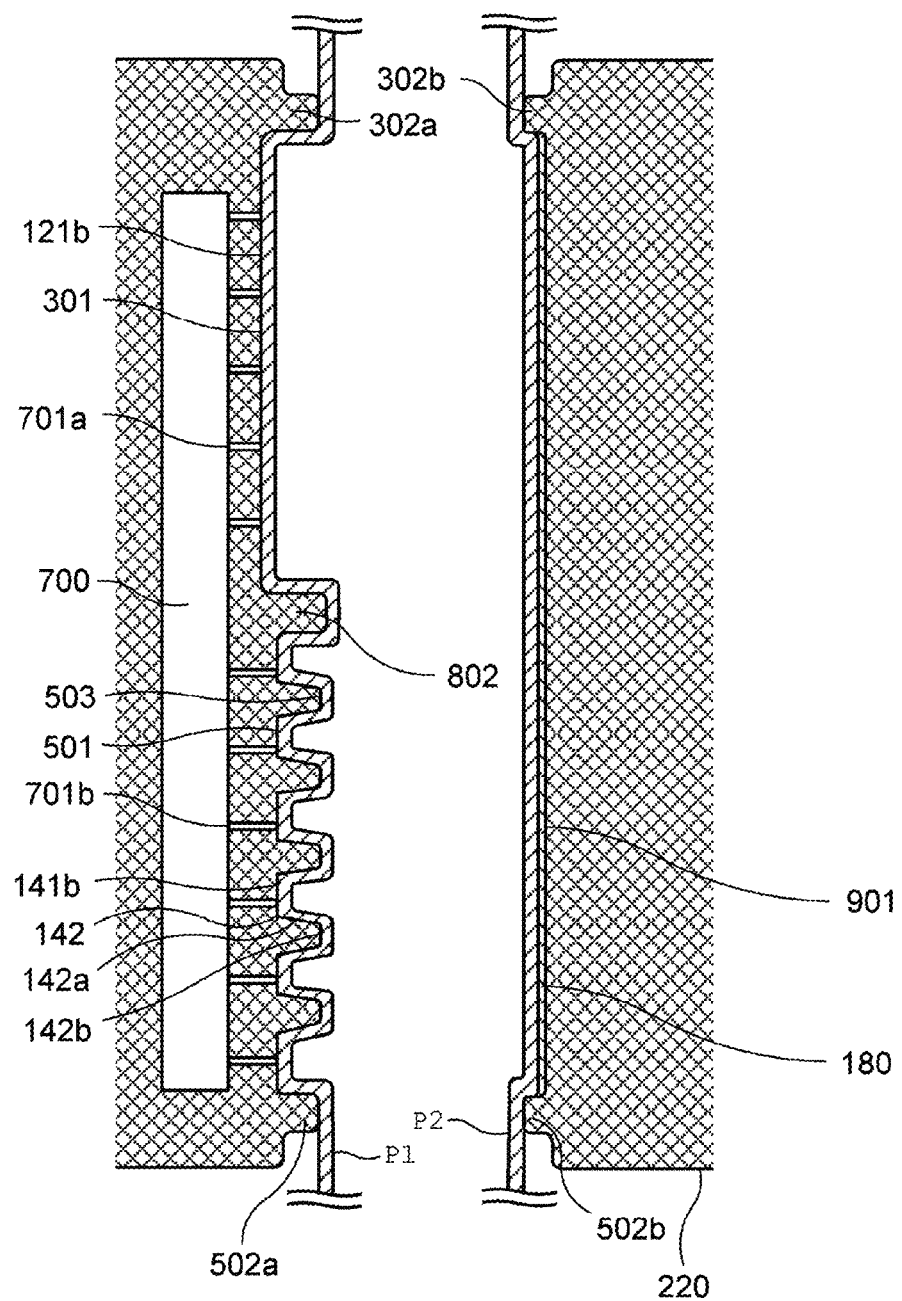
FIG. 14C is a schematic diagram showing the manufacturing method of the resin panel 110 according to the first embodiment of the second invention of the present application.

FIG. 14B and FIG. 14C are schematic diagrams showing the manufacturing method of the resin panel 110 according to the first embodiment of the present disclosure. Specifically, FIG. 14B shows the formation of the enclosed space in the Step 2 between the first mold 210 with the first cavity 301 and the second cavity 501 and the resin sheet P1, and between the second mold 220 with the third cavity 901 and the resin sheet P2. Further, FIG. 14C shows a state where the resin sheet P1 and the resin sheet P2 in the molten state are shaped in the Step 2 along the first mold 210 with the first cavity 301 and the second cavity 501 and the second mold 220 with the third cavity 901, respectively.

In the Step 2, as shown in FIG. 14B, the first mold 210 is first moved to bring the standing wall 302*a* and the standing wall 502*a* into contact with the resin sheet P1. At this time, a lower end of the resin sheet P1 is pressed against a side of the standing wall 502*a* of the first mold 210 using, for example, a clip-shaped member, and an enclosed space 710 is formed by the standing wall 302*a*, the first cavity 301, the ridge 802, the second cavity 501, the standing wall 502*a*, and the resin sheet P1. Similarly, the second mold 220 is moved to bring the standing wall 302*b* and the standing wall 302*b* into contact with the resin sheet P2, and an enclosed space 902 is formed by the standing wall 302*b*, the third cavity 901, the standing wall 502*b*, and the resin sheet P2. Since the skin material 180 is used in the present embodiment, the enclosed space 902 is formed with the skin material 180 interposed between the resin sheet P2 and the second mold 220.

Here, according to FIG. 14B, the first mold 210 further includes a vacuum suction chamber 700 for depressurizing and sucking air from the enclosed space 710, a plurality of suction holes 701*a*, and a plurality of suction holes 701*b*. Further, although not specifically shown in the drawings, the second mold 220 also has a vacuum suction chamber and a plurality of suction holes as well.

Next, as shown in FIG. 14C, the air filled in the formed enclosed space 710 is sucked under reduced pressure from the suction hole 701*a* and the suction hole 701*b* of the first mold 210 to shape the sheet along the first cavity 301, the ridge 802, and the second cavity 501. Specifically, the first back side layer 121*b* forming the accommodation space 123 of the first region 120 of the resin panel 110 is formed along the first cavity 301. Further, the second back side layer 141*b* forming the second region 140 of the resin panel 110 is formed along the second cavity 501. In this regard, the second cavity 501 has a plurality of convex portions 303. As a result of shaping along the plurality of convex portions 303, the concave portion 142 including the wall portion 142*a* and the top 142*b* is formed at a position corresponding to each of the convex portions 303.

Similarly, the air filled in the enclosed space 902 is sucked under reduced pressure from the suction holes of the second mold 220 to shape the sheet along the third cavity 901. The skin material 180 is pressed against the second mold 220 by the resin sheet P2 and is integrally formed on the resin sheet P2. Specifically, the skin material 180 and the resin sheet P2 are integrated with each other by welding the skin material 180 to the resin sheet P2 or by allowing the resin of the resin sheet P2 to soak into the skin material 180.

5. Step 3

Figure 14D:
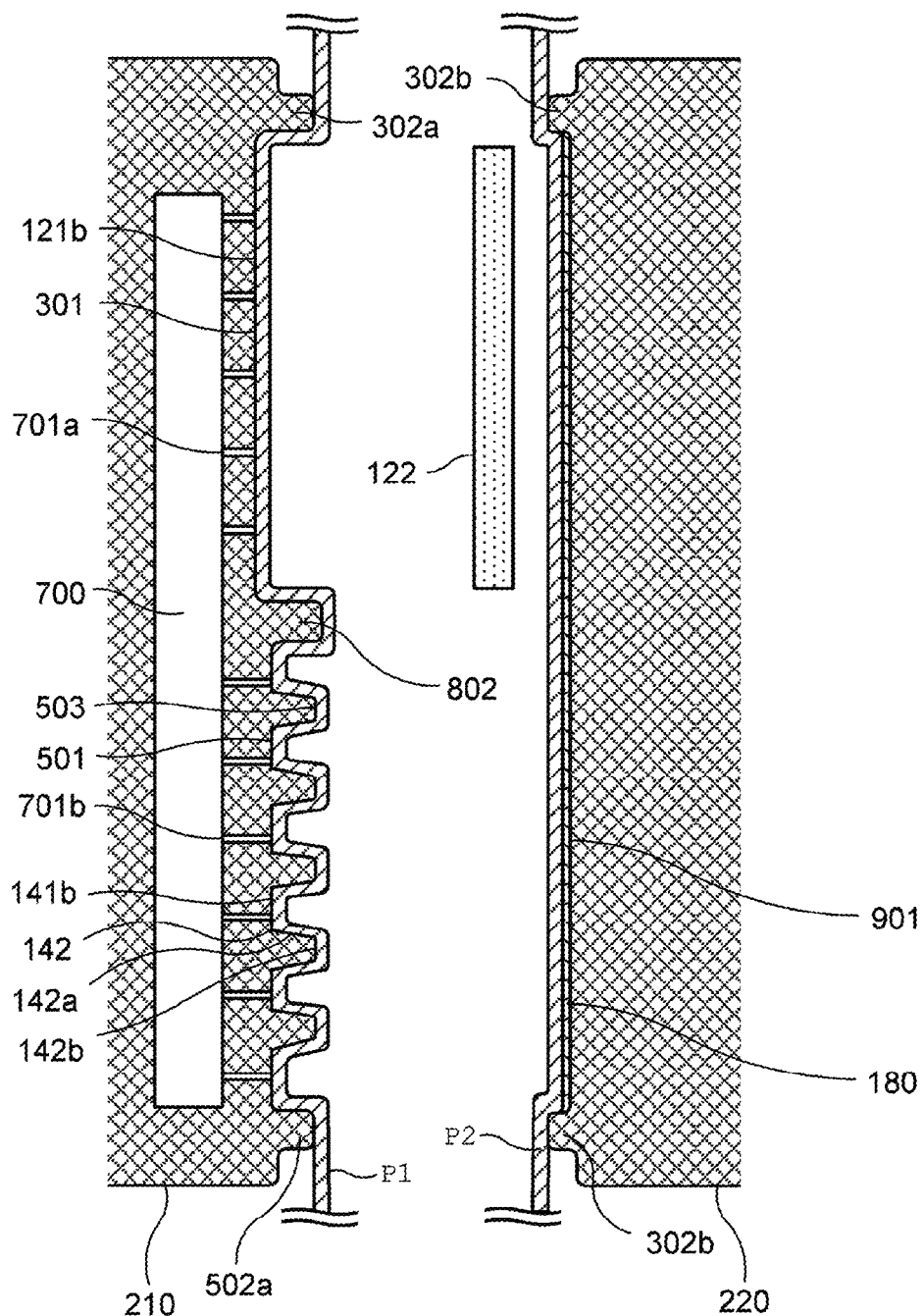
FIG. 14D is a schematic diagram showing the manufacturing method of the resin panel 110 according to the first embodiment of the second invention of the present application.
Figure 14E:
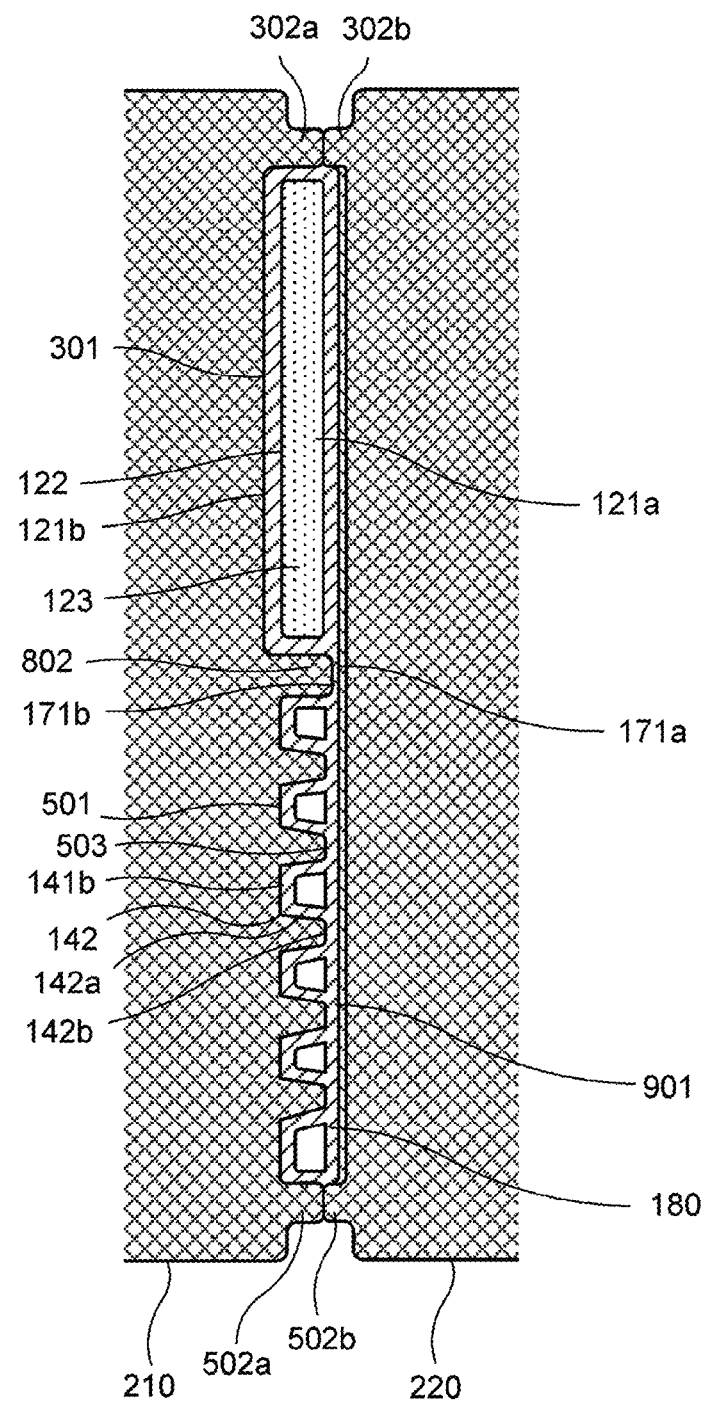
FIG. 14E is a schematic diagram showing the manufacturing method of the resin panel 110 of according to first embodiment of the second invention of the present application.
Figure 14F:
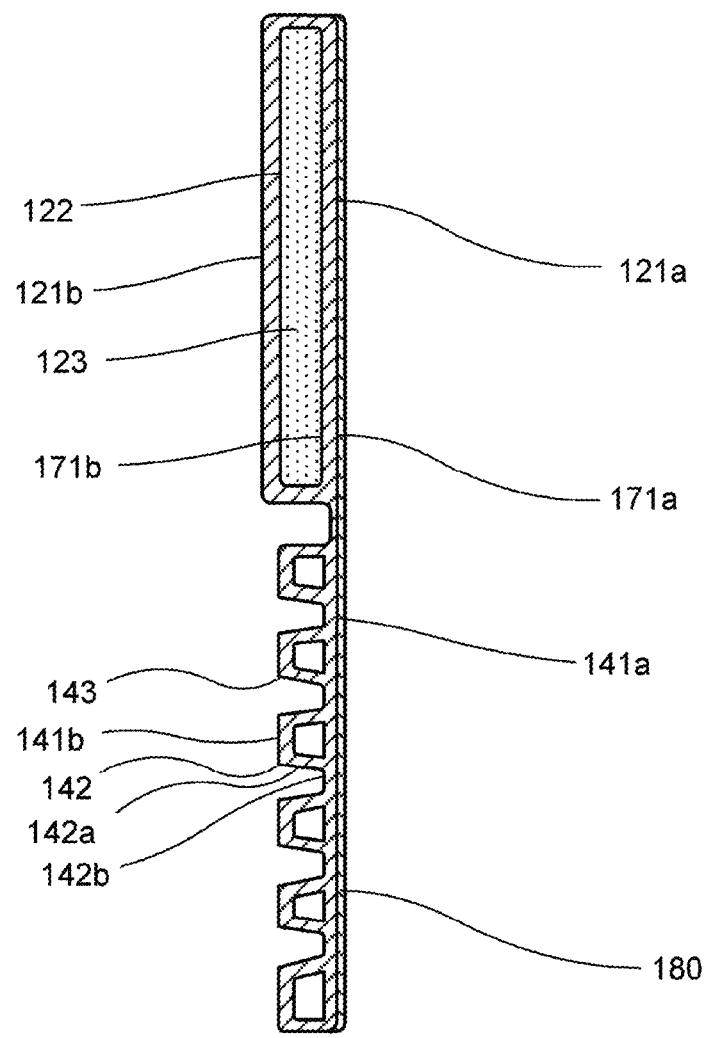
FIG. 14F is a schematic diagram showing the manufacturing method of the resin panel 110 according to the first embodiment of the second invention of the present application.

FIG. 14D to FIG. 14F are schematic diagrams showing the manufacturing method of the resin panel 110 according to the first embodiment of the present disclosure. Specifically, FIG. 14D shows a state in the Step 3 where the core material 122 is arranged between the first mold 210 and the second mold 220 in the open position. FIG. 14E shows a state in the Step 3 where the peripheral edge of the shaped resin sheet P1 and the peripheral edge of the resin sheet P2 are integrated with each other by relatively moving the pair of the first mold 210 and the second mold 220 from the open position to the mold clamping position. FIG. 14F shows a state in the Step 3 where the resin panel 110 is obtained by taking out a molded body from the first mold 210 and the second mold 220 in the mold clamping position and removing burrs from the welded peripheral edge portion.

In the Step 3, as shown in FIG. 14D, the core material 122 is first arranged by a holding tool (not shown) between the first mold 210 and the second mold 220 in the open position. Then, the core material 122 is moved by the holding tool in the direction toward the second mold 220 to be welded to the resin sheet P2. Since the core material 122 is arranged in the accommodation space 123 formed in the first region 120 of the resin panel 110, it is welded in the position corresponding to the accommodation space 123.

In this regard, although the core material 122 is moved to a side of the second mold 220 and welded to the resin sheet P2, it may be moved to a side of the first mold 210 and welded to the resin sheet P1. Further, preferably, the surface of the core material 122 is melted by the heat of the resin sheet P2 in the molten state, so that the core material 122 is welded to the resin sheet P2. Therefore, for the raw material of the core material 122, it is more preferable to select a material that can be melted by the heat of the resin sheet P2.

Next, as shown in FIG. 14E, the first mold 210 and the second mold 220 in the open position are moved relative to each other to the mold clamping position, and the first mold 210 and the second mold 220 are clamped. Specifically, the first mold 210 and the second mold 220 are moved until the standing wall 302a and the standing wall 302b, and the standing wall 502a and the standing wall 502b are respectively brought into contact with each other. At this time, since the standing wall 302a and the standing wall 302b, and the standing wall 502a and the standing wall 502b are brought into contact with each other, the peripheral edges of the resin sheet P1 and the resin sheet P2 are welded and fixed to each other and integrated. After the integration, although not specifically shown in the drawings, air is blown into the inside of the molded body formed by the integration of the resin sheet P1 and the resin sheet P2, in particular into the region where the second region 140 of the resin panel 110 is formed, to shape the molded body by this blowing pressure. Consequently, the resin can be formed into a shape that more accurately follows the second cavity 501, which has a complex shape due to the plurality of convex portions 503. Preferably, air is not blown into the first region 102 where the core material 122 is laminated, by inserting an air release needle and is blown only into the second region 104 where the core material 122 is not present and the hollow portion 144 is formed. While the first region 102 is a laminated body, which may cause the contraction of the core material 122 accommodated in the accommodation space 103 and fusion defect with the skin material 180, the second region 104 is a hollow portion, which improves transferability to the molds and cooling efficiency. In this regard, when air is not blown in, it is necessary to prolong cooling time because the cooling efficiency of the resin sheet decreases.

Here, the ridge 802 separating the first cavity 301 and the second cavity 501 is formed to have a height lower than the height of the standing wall 302a and the standing wall 502a and higher than the height of the convex portion 503. Therefore, when the first mold 210 and the second mold 220 are clamped, the portion corresponding to the third region 170 is not completely divided though the resin is compressed by the ridge 802 and the thickness of the portion (t3 in FIG. 12) is smaller than the thickness of the resin (t4 in FIG. 12) forming the first region 120 and the second region 140. This makes it possible for the third region 170 corresponding to the ridge 802 to serve as a hinge.

Further, as described above, the convex portion 503 is formed to have a height lower than the height of the standing wall 302a and the standing wall 502a and lower than the height of the ridge 802, as shown in FIG. 14B. Therefore, when the molds are clamped, the thickness of the portion corresponding to the top 142b of the second region 140 (t5 in FIG. 12) is formed to be larger than the thickness of one resin sheet (t4 in FIG. 12) by the difference in height with the convex portion 503.

Next, as shown in FIG. 14F, the first mold 210 and the second mold 220 are opened to take out the formed molded body. Then, the desired resin panel 110 is obtained by removing burrs formed on an outer side of the peripheral edges of the resin sheet P1 and the resin sheet P2. In the resin panel 110, as described in FIG. 10 to FIG. 13, the first region 120 accommodating the core material 122 inside, the second region 140 having a predetermined rigidity without accommodating the core material, and the third region 170 connecting the first region 120 and the second region 140 are integrally molded with resin.

The resin panel in which the regions are integrated can be manufactured by the manufacturing method shown in FIG. 14A to FIG. 14F. Although each of the steps has been described with specific examples in the present embodiment, steps other than the above-described steps may be included. Further, in some cases, some of the steps may be omitted. Further, the above-described manufacturing method is one example of the manufacturing method of the resin panel 110 in which the regions are integrally formed. Therefore, the resin panel 110 may be manufactured by any manufacturing method as long as it has the structure described in FIG. 10 to FIG. 13.

As described above, in the present embodiment, the resin panel 110 has a shape in which the first region 120, the second region 140, and the third region 170 are integrally molded. Therefore, a plurality of regions having different characteristics (the first region 120 with the core material 122 and the second region 140 without the core material) can be integrally formed in a single molding. Further, by forming the concave portion 142 in the second region, the predetermined rigidity against loads in the thickness direction can be provided. Further, by forming the third region 170 to have the thickness smaller than the thickness of the resin in the other regions, it can serve as a hinge allowing the first region 120 and the second region 140 to be bent with respect to each other.

Further, in the manufacturing method of the resin panel 110 in the present embodiment, the mold including the first cavity 301 corresponding to the first region 120 of the resin panel 110, the second cavity 501 corresponding to the second region 140, and the ridge 802 separating them is used. Therefore, the first region 120, the second region 140, and the third region 170 can be integrally molded.

<Other Embodiments of Second Invention>

In the first embodiment, a case where two regions (the first region 120 and the second region 140) are connected by the third region 170 has been described. However, the present invention is not limited thereto. It is also possible to make a resin panel in which regions are combined in multiple steps, for example, by forming the first region 120, the third region 170, the second region 140, the third region 170, the first region 120, the third region 170, and the second region 140 in this order.

Further, the resin panel 110 in which the regions and the skin material 180 are laminated has been described in the first embodiment. However, the present invention is not limited thereto, and the resin panel may not include the skin material 180, or another functional material may be laminated in the resin panel.

Further, the resin panel 110 having a substantially plate-shaped has been described in the first embodiment. However, the present invention is not limited thereto, and a resin panel may have a desired three-dimensional shape.

Further, the resin panel 110 having the first region 120 in which the core material 122 is accommodated inside has been described in the first embodiment. However, the first region 120 may have a structure including, in addition to the core material 122, another structure (for example, a concave portion) for providing rigidity or may be formed with only the above-described structure instead of the core material 122.

Further, in the manufacturing method of the resin panel 110 (FIG. 14A to FIG. 14F) in the first embodiment, the first region 102 is formed on a side of the extruder 113, and the second region 104 is formed below the first region 102. However, the present invention is not limited thereto. The second region 104 may be formed on the side of the extruder 113, and the first region 102 may be formed below the second region 104.

In this regard, it is also possible to combine the components described in the embodiments as appropriate or replace them to form a system.

While the embodiments to which the present invention is applied have been described, the scope of the present invention is not limited by the above embodiments, and various changes can be made without departing from the scope of the invention.

The invention claimed is:

1. A luggage room board configured to be opened and closed, comprising:
  a luggage room board main body made of resin, the luggage room board main body having an upper surface and a back surface opposite to the upper surface, the back surface having at least one concave portion; and
  at least one tape-shaped cushioning member attached to the back surface such that one end of the at least one tape-shaped cushioning member enters the at least one concave portion, wherein, in a plan view as viewed in a direction normal to the back surface, an entire part of the at least one tape-shaped cushioning member is located inside the outer periphery of the back surface.

2. The luggage room board of claim 1, wherein the at least one concave portion is formed such that a depth gradually increases toward the end of the at least one tape-shaped cushioning member, and the depth of the at least one concave portion at the end of the at least one tape-shaped cushioning member is approximately same as a thickness of the at least one tape-shaped cushioning member or larger than the thickness of the at least one tape-shaped cushioning member.

3. The luggage room board of claim 1, wherein the at least one tape-shaped cushioning member comprises two tape-shaped cushioning members, the two tape-shaped cushioning members are attached along two sides substantially orthogonal to a rotation center line serving as a rotation center during opening and closing operation of the luggage room board, and the at least one concave portion is provided at an end of each of the two tape-shaped cushioning members on a side of the rotation center line.

\* \* \* \* \*